2 Sheets—Sheet 1.
J. G. STEPHENS & F. DARKIN.
Process and Apparatus for Manufacturing Fiber.
No. 226,801. Patented April 20, 1880.
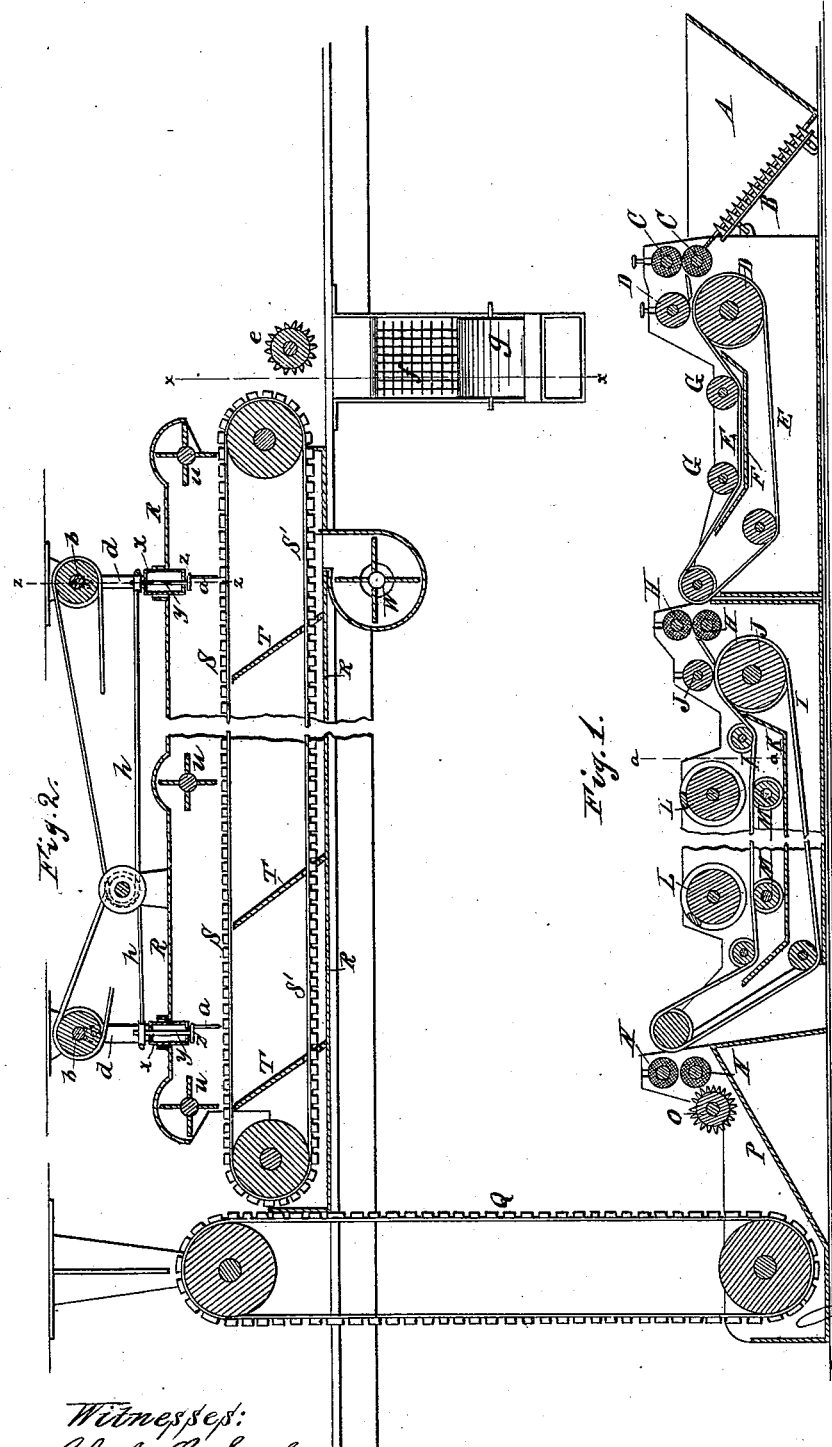

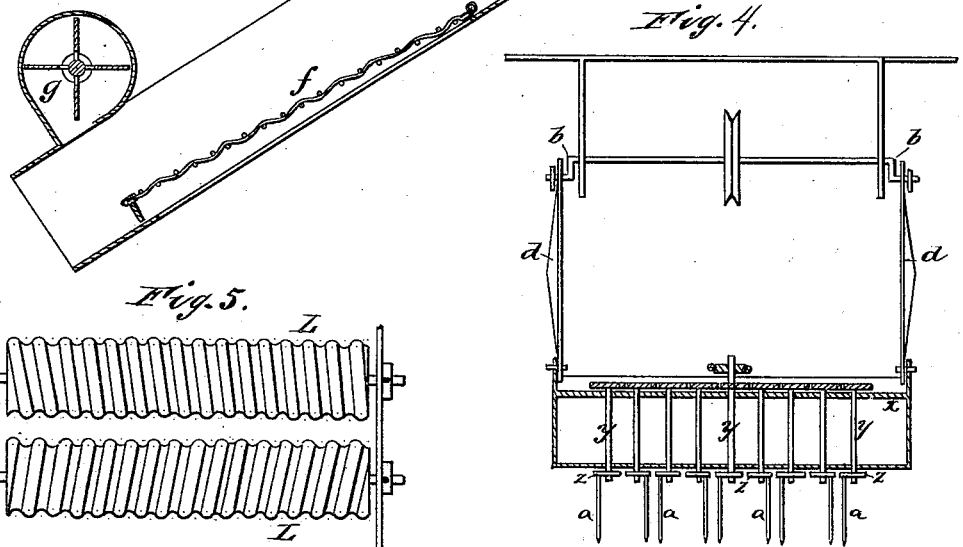
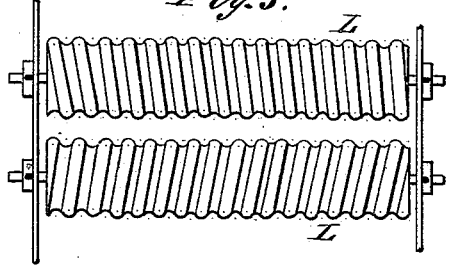
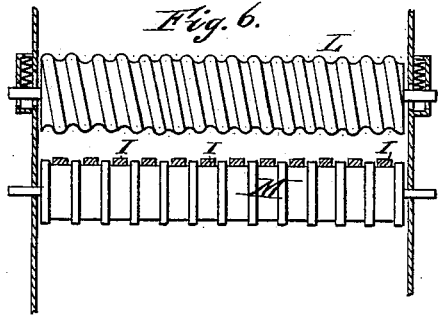

UNITED STATES PATENT OFFICE.

JOHN G. STEPHENS AND FRANK DARKIN, OF BROOKLYN, NEW YORK.

PROCESS AND APPARATUS FOR MANUFACTURING FIBER.

SPECIFICATION forming part of Letters Patent No. 226,801, dated April 20, 1880.

Application filed January 6, 1880.

*To all whom it may concern:*

Be it known that we, JOHN G. STEPHENS and FRANK DARKIN, residing in Brooklyn, Kings county, and State of New York, have made and invented new and useful Improvements in Mechanical Apparatus and Methods of Operation for Manufacturing Fiber and other Material from Pine-Leaves and other Vegetable Substances, of which the following is a specification.

Our invention consists in mechanical apparatus and methods of operation for the subsequent manipulation of pine-leaves after they have been boiled or otherwise treated with an alkaline solution or its equivalent.

We are aware that patents have been granted for the treatment of pine-leaves with a chemical solution, as above mentioned, and that attempts have been made to produce a marketable article by boiling the leaves in such a solution; but the resulting product is absolutely unfit for the market in its then condition, being simply so much semi-prepared stock, requiring an extended chemical and mechanical treatment in order to render it suitable for use in any of the arts.

At the conclusion of the boiling process the material consists of hollow stalks containing a thick muddy liquid consisting of the partially-dissolved resinous and other matters pertaining to the raw material, and also a large proportion of free alkali.

In order to produce a marketable article it is essential, first, to neutralize the alkali and to wash the leaves perfectly clean, and also to submit them to a series of mechanical processes more or less extended, according to the character of the product required.

With the machinery about to be described we propose to perform the neutralizing, washing, and mechanical processes consecutively and automatically.

Figure 1 in the accompanying drawings is a longitudinal elevation of the apparatus for neutralizing and washing the material, and also subjecting it to some of the mechanical processes, as aforesaid. Fig. 2 is a sectional elevation of drying apparatus and other apparatus for mechanically treating the material and for separating the dust and other matters preparatory to delivering it in the condition for bailing for market. Fig. 3 is a transverse section on line *x x* of Fig. 2. Fig. 4 is a section on line *z z*, Fig. 2. Fig. 5 is a detail, in plan, showing the reverse spiral arrangement of two contiguous rubbing-rollers, and Fig. 6 is a section on line *a a*, Fig. 1.

In boiling the leaves we prefer to use a steam-tight cylindrical vessel capable of withstanding pressure, and either revolving upon its axis or containing an agitator, for the purpose of producing a more uniform mixture of the chemicals with the material to be treated.

Upon its removal from the boiler the material is placed in a hopper, A, with which is connected a suitable self-acting feeding apparatus, B, which takes the leaves from the hopper and spreads them in a layer of uniform width and thickness, the leaves lying as nearly as possible parallel with each other and also with the direction of the motion. This layer remains intact, or nearly so, during the whole of the chemical and washing processes, and is only broken up after the moisture is finally squeezed out and the material is ready to be submitted to the drying and other processes incidental thereto.

The layer of material is first submitted to the action of one or more pairs of rollers, C, under pressure due to springs, weights, or other appliances, the rollers being preferably covered with rubber or other elastic material. The object of using these rollers is twofold—first, to free the material as far as possible from the alkaline solution and liquid impurities contained in it, and also to split the leaves and render them capable of absorbing the water and other liquids through which they are subsequently passed.

The material is drawn from the squeezers at a slightly-increased rate of speed by a pair of feed-rollers, D, which deliver it upon a conveyer or traveler, E, which carries it under the depressing-rollers G, through a bath, F, containing a solution of sulphuric or other acid, for the purpose of neutralizing the alkali. The object of the increased speed referred to is to draw out and partially separate the leaves one from the other, and thus render the mass of material more absorbent than it would be if left in the closely-compressed condition in which it leaves the squeezing-roller.

After leaving the said bath the material is passed through another set of squeezing-rollers, H, in order to get rid as far as possible of the acid solution, and is then delivered upon another conveyer, I, of the same nature as the one already mentioned, the process of drawing out the layer of leaves by an increase of speed being repeated by feed-rollers J. This second conveyer passes through a long trough or bath, K, through which there is a constant flow of clean water, (preferably hot,) and in which, while under the water, the leaves are subjected to the action of various kinds of rollers, which can be adjusted at will, so as to simply apply moderate pressure or to produce a transverse rubbing motion at the same time, for the purpose of flattening and splitting the leaves and separating them into fiber more or less, according to the extent to which the process is carried. The rollers in this bath may be of varied construction and material to suit the various products manufactured, and the transverse rubbing motion may be produced by making the rollers in pairs L M, with a screw on the surface of the upper roller, which is driven at a different speed from the lower one, or by rings on both rollers, and applying lateral motion to the shafts by means of cams or other suitable mechanism, thus causing a sliding reciprocating motion between the surfaces of the two rollers.

We prefer to apply the water which feeds this bath in the form of jets directed upon the material as it leaves the bath after passing through the series of rubbing-rollers.

Upon leaving the bath just described the material is passed through one or more pairs of squeezing-rollers, N, under heavy pressure, for the purpose of freeing it as far as possible from moisture and facilitating the process of drying. As the material leaves the last pair of squeezing-rollers it is subjected to the action of a rapidly-revolving picker, O, or other suitable mechanism, in order to break up the layer into single leaves or fibers, as the case may be, and to throw it loosely into a hopper, P. From this hopper the fiber is taken preferably by a feeding apparatus of the same nature as the one, B, described at the commencement of the process, and spread loosely in a layer for delivery to the drying-machine; but we have here shown an elevator, Q, to carry the material to the drier, located above. This machine consists of a long box or tunnel, R, through which passes a traveler or conveyer, S, of sufficient stability to carry the fiber which is spread upon it, but constructed in such a manner as to allow free passage for air both upward and downward.

At intervals of every few feet there are placed deflectors T and U, alternately above and below the traveler, those placed below being fixed at an angle of forty-five degrees or thereabout, and those above the traveler being constructed preferably in the form of revolving fans or shutters and driven at the same surface-speed as the traveler which carries the fiber. This form of construction is adopted in order to avoid the possibility of the fiber heaping up in front of the deflectors and causing an obstruction to the working of the machine.

A blast of air is introduced by fan W at one end of the machine, and is forced through and between the fibers in an upward and downward direction alternately by means of the deflectors above mentioned, and is finally discharged, saturated with moisture, at the opposite or same end at which the moist fiber is fed into the machine, the air and the material to be dried thus traveling in opposite directions.

Heat is applied either by steam-pipes or otherwise within the machine, or the air is heated before entering it, or both methods are combined.

Both at the entrance of the machine and at intervals inside it there are provided frames X, containing rapidly-revolving spindles Y, having at their lower ends disks Z, at the periphery of which are fastened points or pins $a$, of several inches in length. These frames, with the revolving spindles, have a constant rising-and-falling movement, caused by cranks $b$ and rods $d$, so that the pins are alternately extended into the fiber and raised above its level. The object of this arrangement is to loosen and mix up the fiber, and at the same time give it a tendency to curl. The spindles are geared together in a train, and one has a driving-belt to operate it.

Upon leaving the drying-machine the fiber is separated and teased by a suitable picking apparatus, $e$, and then made to pass over a rapidly-agitated wire screen, $f$, exposed to a blast of air from a fan, $g$, for the purpose of cleaning it from dust and other matter. After this operation the article is ready for the market.

Having thus described our invention, what we claim, and desire to secure by Letters Patent, is—

1. The process of squeezing and transversely rubbing the said vegetable material while undergoing the washing process, substantially as described.

2. The combination, in apparatus for the manufacture of fibrous material from fine leaves and other vegetable substance subsequent to boiling the same in an alkaline solution, of the following apparatus and mechanism, viz: an automatic feeding device, B, squeezing-rollers C, travelers or carrier E, neutralizing-bath F, squeezing-rollers H, travelers or carrier I, washing-bath K, and a drying apparatus, substantially as described.

3. The combination of transversely-rubbing rollers L M, traveler or carrier I, and a washing-bath, substantially as described.

4. The combination of the deflectors T and U with the fan W, carrier S, and the case of the drying apparatus, substantially as described.

5. The reciprocating and rotating spindles $y$ and pins $a$, combined with the carrier S, substantially as described.

JOHN GEORGE STEPHENS.
FRANK DARKIN.

Witnesses:
F. A. THAYER,
W. J. MORGAN.